US010857853B2

(12) United States Patent
Han et al.

(10) Patent No.: US 10,857,853 B2
(45) Date of Patent: Dec. 8, 2020

(54) ADAPTIVE RADIANT HEATING SYSTEM AND METHOD FOR ACHIEVING VEHICLE OCCUPANT THERMAL COMFORT

(71) Applicant: GM Global Technology Operations LLC, Detroit, MI (US)

(72) Inventors: Taeyoung Han, Bloomfield Hills, MI (US); Shailendra Kaushik, Novi, MI (US); Kuo-huey Chen, Troy, MI (US); Chih-hung Yen, Bloomfield Hills, MI (US); Bahram Khalighi, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 35 days.

(21) Appl. No.: 16/400,544

(22) Filed: May 1, 2019

(65) Prior Publication Data

US 2020/0346517 A1 Nov. 5, 2020

(51) Int. Cl.
*F24F 11/00* (2018.01)
*B60H 1/00* (2006.01)
*B60H 1/03* (2006.01)
*G01K 13/00* (2006.01)

(52) U.S. Cl.
CPC ..... *B60H 1/00742* (2013.01); *B60H 1/00892* (2013.01); *B60H 1/034* (2013.01); *G01K 13/004* (2013.01)

(58) Field of Classification Search
CPC ............ B60H 1/00742; B60H 1/00878; B60H 1/034; B60H 1/00735; B60H 1/00814
USPC .................................................. 165/202, 237
See application file for complete search history.

(56) References Cited

U.S. PATENT DOCUMENTS

| | | | | |
|---|---|---|---|---|
| 6,079,485 A * | 6/2000 | Esaki | ................. | B60H 1/00285 165/42 |
| 6,158,225 A * | 12/2000 | Muto | ................. | B60H 1/00478 62/235.1 |
| 6,439,468 B1 * | 8/2002 | Lambert | ............ | B60H 1/00735 236/49.3 |
| 6,470,960 B2 * | 10/2002 | Kampf | ............... | B60H 1/00378 165/42 |
| 6,886,356 B2 * | 5/2005 | Kubo | ................. | B60H 1/00385 62/230 |

(Continued)

*Primary Examiner* — Claire E Rojohn, III
(74) *Attorney, Agent, or Firm* — Quinn IP Law

(57) ABSTRACT

A method of regulating thermal comfort of an occupant of a vehicle cabin uses a radiant heating tile powered via an energy storage device to generate thermal energy. The method also includes detecting the occupant's position via a position sensor and detecting the occupant's surface temperature and detecting a temperature of the tile via at least one temperature sensor. The method additionally includes determining, via an electronic controller, a rate of change of occupant's surface temperature and a difference between the tile temperature and the occupant's surface temperature relative to a predetermined temperature set-point. The method further includes regulating, via the electronic controller, a power input from the energy storage device to the tile in response to the determined rate of change of the surface temperature and the determined difference between the tile temperature and the occupant's surface temperature to thereby regulate the occupant's surface temperature.

20 Claims, 5 Drawing Sheets

(56) References Cited

U.S. PATENT DOCUMENTS

| | | | | |
|---|---|---|---|---|
| 7,095,501 B2* | 8/2006 | Lambert | ............... | B60K 28/063 |
| | | | | 356/437 |
| 7,380,586 B2* | 6/2008 | Gawthrop | ............... | B60H 1/004 |
| | | | | 165/202 |
| 7,533,535 B2* | 5/2009 | Kadle | ............... | B60H 1/00285 |
| | | | | 62/3.3 |
| 7,918,100 B2* | 4/2011 | Breed | ............... | F24F 11/30 |
| | | | | 62/244 |
| 8,191,187 B2* | 6/2012 | Brykalski | ............... | A61G 7/057 |
| | | | | 5/423 |
| 8,359,871 B2* | 1/2013 | Woods | ............... | F25B 21/02 |
| | | | | 62/3.2 |
| 8,412,381 B2* | 4/2013 | Nikovski | ............... | F24F 11/30 |
| | | | | 700/276 |
| 8,839,632 B2* | 9/2014 | Goenka | ............... | B60H 1/00742 |
| | | | | 62/3.61 |
| 9,168,810 B2* | 10/2015 | Ghosh | ............... | B60H 1/247 |
| 9,676,308 B2* | 6/2017 | Zhang | ............... | B60N 2/5657 |
| 9,682,609 B1* | 6/2017 | Dudar | ............... | B60H 1/00785 |
| 9,857,107 B2* | 1/2018 | Inaba | ............... | F25B 21/02 |
| 10,391,876 B2* | 8/2019 | Nordbruch | ............... | H04L 67/141 |
| 10,421,333 B2* | 9/2019 | Kim | ............... | B60H 1/00285 |
| 10,507,745 B2* | 12/2019 | Dry | ............... | B60N 2/5657 |
| 10,603,976 B2* | 3/2020 | Androulakis | ............... | B60N 2/5685 |
| 10,611,211 B2* | 4/2020 | Lee | ............... | B60H 1/00778 |
| 10,675,948 B2* | 6/2020 | Connell | ............... | B60H 1/00742 |
| 2004/0076214 A1* | 4/2004 | Bell | ............... | H01L 35/30 |
| | | | | 374/13 |
| 2008/0103660 A1* | 5/2008 | Browne | ............... | B60R 25/1004 |
| | | | | 701/46 |
| 2008/0173342 A1* | 7/2008 | Bell | ............... | F25B 21/04 |
| | | | | 136/201 |
| 2008/0248736 A1* | 10/2008 | Aoki | ............... | B60H 1/00742 |
| | | | | 454/75 |
| 2010/0140366 A1* | 6/2010 | Burns | ............... | B60H 1/00785 |
| | | | | 236/44 A |
| 2010/0175406 A1* | 7/2010 | Wankhede | ............... | B60H 1/00278 |
| | | | | 62/285 |
| 2011/0127025 A1* | 6/2011 | Bohme | ............... | B60H 1/00428 |
| | | | | 165/202 |
| 2011/0165829 A1* | 7/2011 | Nefcy | ............... | H01M 10/625 |
| | | | | 454/75 |
| 2011/0172880 A1* | 7/2011 | Tamura | ............... | B60H 1/00771 |
| | | | | 701/36 |
| 2011/0199026 A1* | 8/2011 | Forrest | ............... | H02J 7/35 |
| | | | | 315/362 |
| 2012/0112694 A1* | 5/2012 | Frisch | ............... | B60L 53/11 |
| | | | | 320/109 |
| 2012/0227926 A1* | 9/2012 | Field | ............... | F24H 7/0441 |
| | | | | 165/10 |
| 2014/0084679 A1* | 3/2014 | Li | ............... | B60L 8/003 |
| | | | | 307/10.1 |
| 2014/0293538 A1* | 10/2014 | Han | ............... | B60H 1/00271 |
| | | | | 361/690 |
| 2014/0306814 A1* | 10/2014 | Ricci | ............... | G06F 3/0673 |
| | | | | 340/425.5 |
| 2015/0041113 A1* | 2/2015 | Enke | ............... | B60H 1/00421 |
| | | | | 165/202 |
| 2015/0094914 A1* | 4/2015 | Abreu | ............... | B60H 1/00742 |
| | | | | 701/41 |
| 2015/0129192 A1* | 5/2015 | Boss | ............... | B60H 1/00878 |
| | | | | 165/202 |
| 2015/0183293 A1* | 7/2015 | Kim | ............... | B60H 1/00971 |
| | | | | 165/202 |
| 2015/0197135 A1* | 7/2015 | Chen | ............... | B60H 1/00028 |
| | | | | 62/3.61 |
| 2015/0197136 A1* | 7/2015 | Chen | ............... | B60H 1/00285 |
| | | | | 62/3.61 |
| 2016/0107506 A1* | 4/2016 | Johnston | ............... | B60H 1/00278 |
| | | | | 165/202 |
| 2016/0107508 A1* | 4/2016 | Johnston | ............... | B60H 1/00278 |
| | | | | 165/202 |
| 2016/0152112 A1* | 6/2016 | Stetler | ............... | B60H 1/00428 |
| | | | | 62/235.1 |
| 2017/0138627 A1* | 5/2017 | Han | ............... | F24F 11/62 |
| 2017/0369069 A1* | 12/2017 | Yen | ............... | B60W 40/09 |
| 2018/0120873 A1* | 5/2018 | Radermacher | ............... | G05D 23/1927 |
| 2018/0361825 A1* | 12/2018 | Porras | ............... | B60H 1/00385 |
| 2019/0077217 A1* | 3/2019 | Yu | ............... | B60H 1/0073 |
| 2019/0279447 A1* | 9/2019 | Ricci | ............... | B60R 25/25 |
| 2019/0283529 A1* | 9/2019 | Macneille | ............... | B60H 1/00657 |
| 2019/0320503 A1* | 10/2019 | Han | ............... | H05B 1/0236 |
| 2020/0077540 A1* | 3/2020 | Yen | ............... | H05K 7/20172 |
| 2020/0086714 A1* | 3/2020 | Dhar | ............... | B60H 1/00921 |
| 2020/0180396 A1* | 6/2020 | Youn | ............... | B60H 1/00742 |
| 2020/0189352 A1* | 6/2020 | Han | ............... | B60N 2/879 |
| 2020/0193792 A1* | 6/2020 | Mao | ............... | G08B 21/24 |
| 2020/0198445 A1* | 6/2020 | Line | ............... | B60H 1/00371 |
| 2020/0223283 A1* | 7/2020 | Watanabe | ............... | B60H 1/00657 |

\* cited by examiner

ADAPTIVE RADIANT HEATING SYSTEM AND METHOD FOR ACHIEVING VEHICLE OCCUPANT THERMAL COMFORT

INTRODUCTION

The present disclosure is drawn to a system and method for achieving thermal comfort of an occupant of a motor vehicle by controlling adaptive radiant heating.

A majority of modern motor vehicles employ a conventional powertrain using an internal combustion (IC) engine for power generation and propulsion. Some motor vehicles employ a combination of an IC engine and one or more electric motor-generators forming a hybrid powertrain. Additionally, an emerging category of motor vehicles employs electric motor-generators as their sole source of power generation and propulsion.

In a majority of motor vehicles having on-board IC engines, vehicle cabin climate, including cabin warm-up, is typically accomplished via forced air systems having heat exchangers that utilize waste heat energy produced by the IC engine. Typically, subject heat exchangers are coolant-to-air type, with the engine coolant being used to transfer heat energy to the air that is forced into the vehicle cabin. Some conventional powertrain motor vehicles, as well hybrid and electric vehicles employ electrically powered heaters to provide vehicle cabin warm-up and thermal comfort of vehicle occupants.

Thermal comfort is generally defined as a condition of mind that expresses satisfaction with the thermal environment and is assessed by subjective. The human body may be viewed as a heat engine where food is the input energy. The human body will generate and transfer excess heat into the environment, so the body may continue to operate. The transfer of heat is proportional to the difference in temperature between the body and the environment. In a cold environment, the body loses a significant amount of heat to the environment, while in a hot environment the body does not transfer much heat. Both the hot and cold scenarios lead to discomfort. Maintaining a satisfactory level of thermal comfort for occupants of enclosures, such as buildings or vehicles, is one of the important goals of heating, ventilation, and air conditioning (HVAC) design engineers.

Most people will feel comfortable at room temperature, colloquially a range of temperatures around 20 to 22° C. (68 to 72° F.), but this may vary between individuals and depending on factors such as activity level, clothing, and humidity. Thermal neutrality is maintained when the heat generated by human metabolism is allowed to dissipate, thus maintaining thermal equilibrium with the surroundings. The main factors that influence thermal comfort are those that determine heat gain and loss, namely metabolic rate, clothing, insulation, air temperature, mean radiant temperature, air speed, and relative humidity. Psychological parameters, such as individual expectations, also affect thermal comfort.

SUMMARY

A method of regulating thermal comfort of an occupant of a vehicle cabin uses a radiant heating tile powered via an energy storage device to generate thermal energy and arranged inside the cabin proximate a vehicle seat supporting the occupant. The method also includes detecting a position of the vehicle occupant in the cabin and generating a first signal indicative of the detected position via a position sensor. The method additionally includes detecting a surface temperature of the vehicle occupant and generating a second signal indicative of the detected surface temperature and detecting a temperature of the radiant heating tile and generating a third signal indicative of the detected temperature of the radiant heating tile via at least one temperature sensor. The method additionally includes receiving the first, second, and third signals via an electronic controller in operative communication with the radiant heating tile, the position sensor, and the at least one temperature sensor.

The method also includes determining, via the electronic controller, a rate of change of the surface temperature of the vehicle occupant and a difference between the temperature of the radiant heating tile and the surface temperature of the vehicle occupant relative to a predetermined temperature or climate set-point. The method further includes regulating, via the electronic controller, a power input from the energy storage device to the radiant heating tile in response to the determined rate of change of the surface temperature and the determined difference between the temperature of the radiant heating tile and the surface temperature of the vehicle occupant to thereby regulate the surface temperature of the vehicle occupant.

The radiant heating tile may be one of a plurality of radiant heating tiles arranged inside the cabin proximate the seat. In such an embodiment, the method may also include identifying, via the electronic controller, the radiant heating tile corresponding to the detected position of the vehicle occupant from among the plurality of radiant heating tiles. Additionally, the method may include activating, via the electronic controller, the identified radiant heating tile to regulate the surface temperature of the vehicle occupant.

The motor vehicle may include a vehicle body defining the cabin, arranged along a longitudinal axis, and defined by longitudinal body sides, a floor, and a roof. In such a vehicle the plurality of radiant heating tiles may be arranged along the longitudinal axis in an array proximate one of the longitudinal body sides, the floor, or the roof.

The motor vehicle may additionally include a forced-air climate control system. In such a vehicle the method may additionally include supplementing a heat output of the forced-air climate control system with the thermal energy generated by the array of the radiant heating tiles, by coordinating regulation of the forced-air climate control system and the selective control of the radiant heating tiles via the electronic controller.

The at least one temperature sensor may be an infrared sensor. In such an embodiment, the method may also include generating, via the infrared sensor, a sensor image indicative of the surface temperature of the vehicle occupant and the temperature of the radiant heating tile.

The method may also include detecting a temperature of ambient air in the cabin via the at least one temperature sensor.

The method may also include executing, via the electronic controller, an algorithm determinative of the power input from the energy storage device to the radiant heating tile in response to the detected surface temperature of the vehicle occupant, the temperature of the radiant heating tile, the determined rate of change of the surface temperature, and the detected temperature of ambient air in the cabin.

The position sensor may be an in-vehicle camera. In such an embodiment, the method may also include detecting, via the in-vehicle camera, the position of the vehicle occupant.

The radiant heating tile may be constructed from a positive temperature coefficient (PTC) material.

The method may also include over-riding the predetermined temperature set-point via an operator input to the electronic controller.

An adaptive radiant heating system for regulating thermal comfort of a vehicle occupant by employing the above method is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
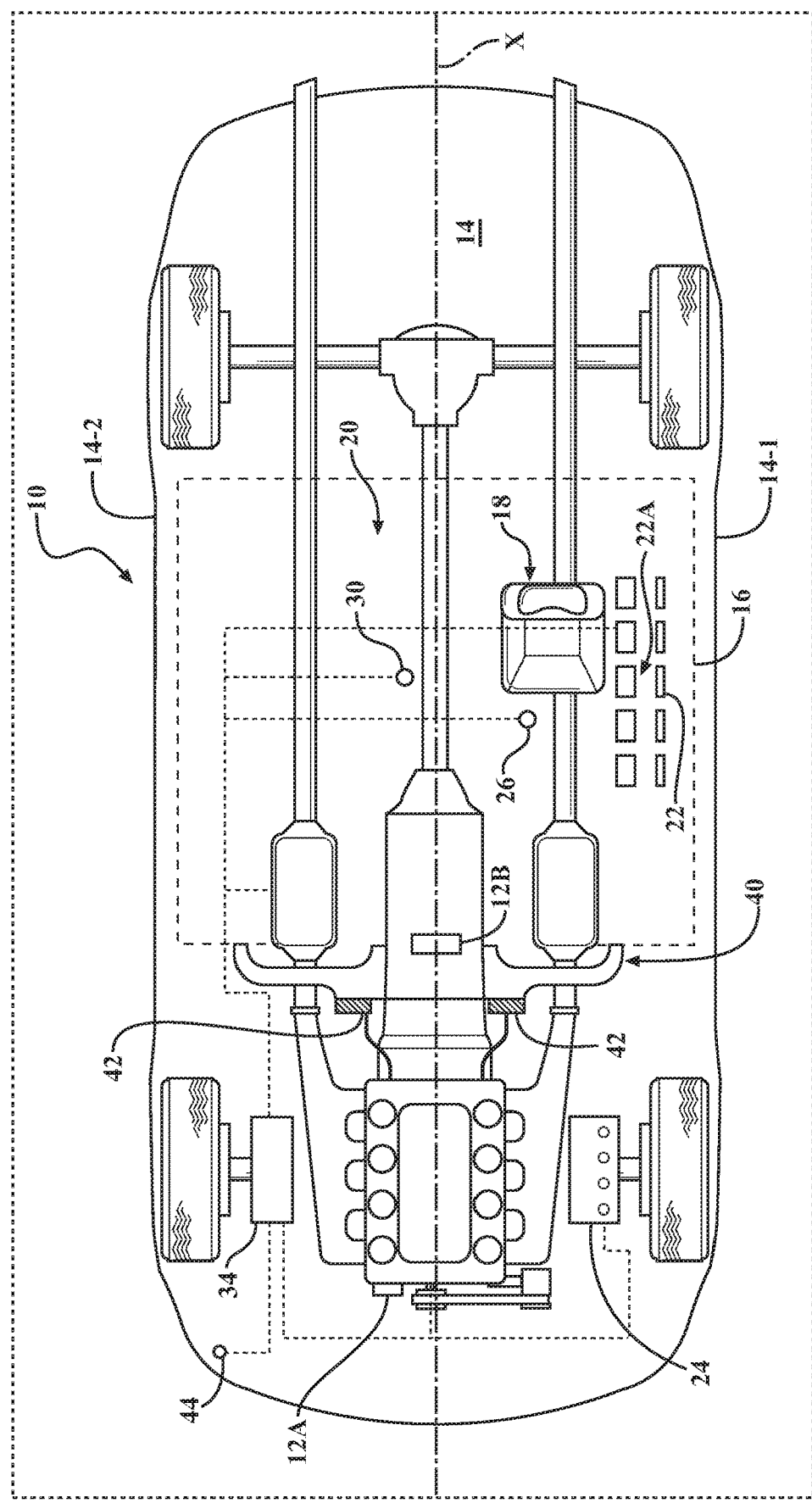
FIG. 1 is a schematic plan view of a motor vehicle having an adaptive radiant heating system along with a forced-air climate control system, according to the present disclosure.

Referring to the drawings, wherein like reference numbers refer to like components throughout the several views, FIG. 1 schematically depicts a motor vehicle 10. The motor vehicle 10 includes a powerplant configured to generate an output torque for powering the vehicle. As shown, the powerplant may be an internal combustion (IC) engine 12A configured to propel the vehicle via driven wheels. Such an internal combustion engine 12A may be a spark-ignition type or a compression-ignition or diesel type of an engine. Additionally, the vehicle 10 may employ hybrid propulsion, where torque output from the engine 12A is augmented with other power sources, such as electric motor(s) 12B. Alternatively, the vehicle 10 may employ electric motor(s) 12B without an IC engine, and thus be configured as an electric vehicle.

The vehicle 10 may be configured as an autonomous vehicle in which assistance from various vehicle systems is employed in operating the vehicle, up to and including full automation which eschews operator involvement. The vehicle 10 is generally characterized by a vehicle body 14 arranged along a longitudinal axis X in a vehicle body plane P, and defined by longitudinal body sides 14-1, 14-2 (shown in FIG. 1), a floor 14-3, and, in some cases, a roof 14-4 (shown in FIGS. 2 and 4). The vehicle body 14 defines a vehicle interior or cabin 16 configured to accommodate vehicle occupant(s) or passenger(s) 17 (shown in FIGS. 2-4). Specifically, as shown in FIGS. 1-4, at least one seat 18 is moveably arranged or mounted in the cabin 16. Each seat 18 is configured to support the vehicle occupant 17 via a number of adjustments, such as for seat position along the axis X and seat height relative to the floor 14-3. The seat 18 includes a seatback 18-1 and a cushion 18-2. The seat 18 may also include a recliner mechanism 18-3, i.e., a recline adjustment of the seatback 18-1 relative to the cushion 18-2.

Figure 2:
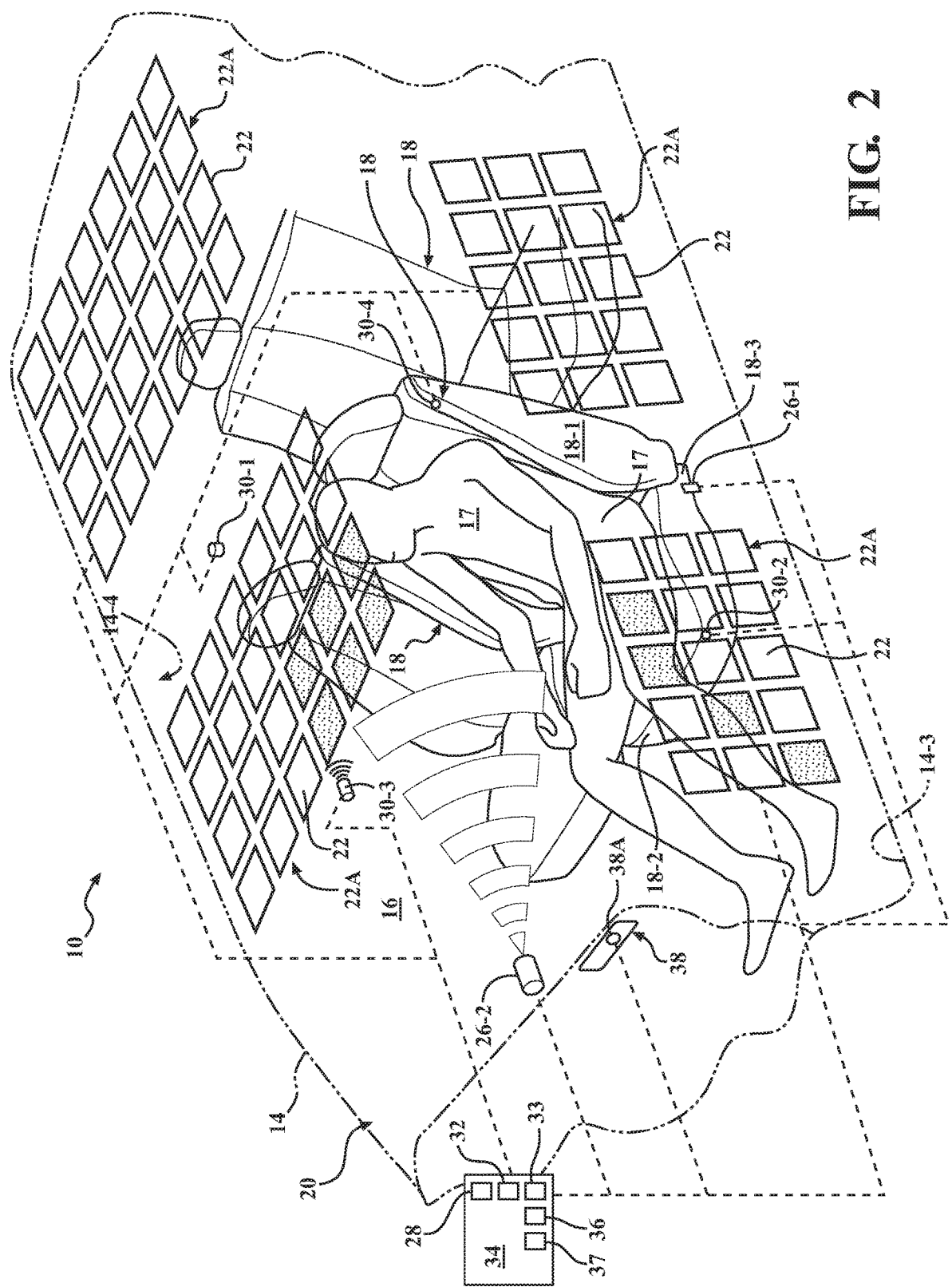
FIG. 2 is a partial perspective view of a vehicle cabin showing a conventional seating arrangement and the adaptive radiant heating system tiles arranged in individual arrays, according to the present disclosure.
Figure 3:
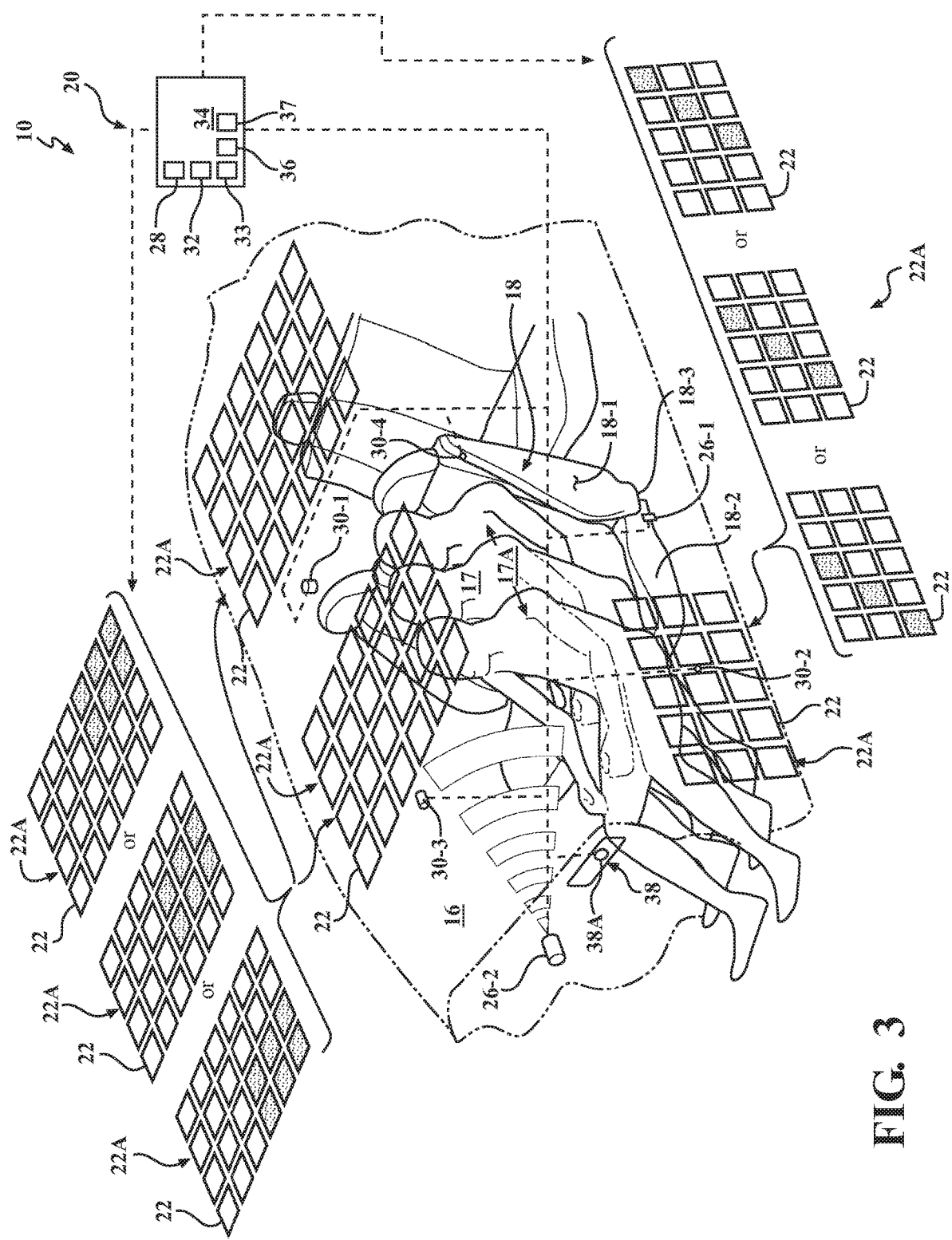
FIG. 3 is a partial perspective view of the vehicle cabin shown in FIG. 2, showing variable selection of the adaptive radiant heating system tiles among the individual arrays in accordance with the position of the vehicle occupant, according to the present disclosure.
Figure 4:
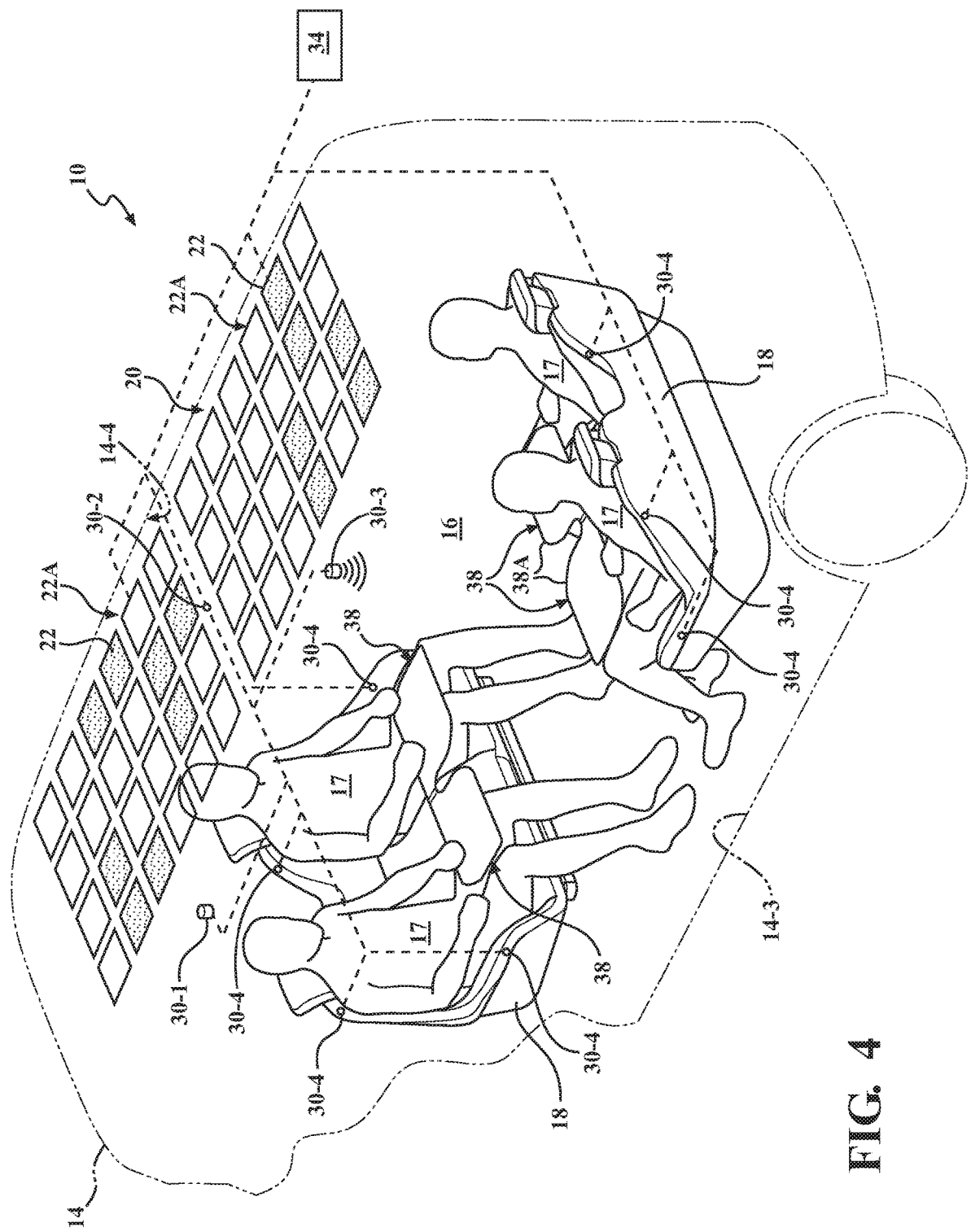
FIG. 4 is a partial perspective view of the vehicle cabin showing an alternative seating arrangement, according to the present disclosure.

FIGS. 2 and 3 specifically depict a conventional seating arrangement, where the seats 18 face the front of the vehicle 10. As shown in FIG. 4, the vehicle 10 may employ an alternative seating arrangement, where at least some of the seats 18 face each other. Such an alternative seating arrangement may be especially useful in autonomous vehicles.

As shown in FIGS. 1-4, the vehicle 10 also includes an adaptive radiant heating system 20 for regulating a climate inside the cabin 16, wherein the system includes a plurality of radiant heating tiles 22 inside the cabin proximate the seat 18. As defined herein, the term "radiant" denotes that the heating tiles are configured to generate thermal energy and radiate such energy inside the cabin 16 and toward the occupant 17 of the seat 18. Radiant heating provides almost instantaneous warmth sensation to vehicle occupants 17 with less energy consumption suitable for both electric and conventional vehicles. Each of the radiant heating tiles 22 may be constructed from a positive temperature coefficient (PTC) material. In general, PTC material is characterized by internal resistance that increases with temperature. PTC material is a self-regulating heater capable of rapidly heating up to a constant temperature with application of electrical current, radiating heat outward, and maintaining its temperature unaffected by changes in ambient temperature.

An energy storage device 24 (shown in FIG. 1), such as a battery, is configured to power the radiant heating tiles 22, and facilitate generation of the thermal energy thereby. The radiant heating tiles 22 may be generally arranged along the longitudinal axis X in an array 22A (shown in FIGS. 2-4) proximate one of the longitudinal body sides 14-1, 14-2, proximate the floor 14-3, or proximate the roof 14-4. The adaptive radiant heating system 20 also includes one or more first or position sensors 26 (shown in FIG. 1). Each first sensor 26 is arranged in the cabin 16 and configured to detect a position $P_O$ of the vehicle occupant 17 supported by the seat 18 and generate a first signal 28 indicative of the detected position $P_O$. The first sensor 26 may be indicative of a position of the seat 18 in the cabin 16 when the vehicle occupant 17 is seated therein, or, if the seat includes the seatback recliner 18-3, including a position or state of the recliner and the seatback 18-1, thereby indicative of the position of the vehicle occupant.

An embodiment of the first sensor 26 may be an electronic position sensor 26-1, for example mounted on the seat 18, configured to detect a position of the seat relative to the cabin 16, such as along the axis X. In the embodiment of the seat 18 having the seatback recliner 18-3, the first sensor 26-1 may be configured to detect a position of the recliner, and therefore of the seatback 18-1. In another embodiment, the first sensor 26 may be an in-vehicle camera 26-2 configured to detect the position of the vehicle occupant 17 within the cabin 16. Overall, the adaptive radiant heating system 20 may include a plurality of first sensors, such that more than one embodiment of the first sensor 26-1 and 26-2, with attendant specific parameters being detected, is included on the particular vehicle 10.

The adaptive radiant heating system 20 also includes at least one second or temperature sensor 30 (shown in FIG. 1). The second sensor 30 is arranged in the cabin 16 proximate the plurality of radiant heating tiles 22. At least one of the second sensors 30 is configured to detect a surface temperature $T_O$ of the vehicle occupant 17, and generate a second signal 32 indicative of the detected surface temperature $T_O$. At least one of the second sensors 30 is also configured to detect a temperature $T_t$ of specifically identified radiant heating tile(s) 22, and generate a third signal 33 indicative of the detected temperature $T_t$ of the subject tile(s). The system 20 may include a plurality of the above embodiments of the second sensor 30 to detect ambient temperature in multiple locations throughout the cabin 16. It is specifically intended that there would be at least one second sensor 30 arranged proximate every seat 18 and configured to detect the above-noted temperatures when the subject seat is occupied. Accordingly, one or more of the second temperature sensors 30 are configured to facilitate monitoring of the thermal status of one or more individual vehicle occupants 17 and of the tile(s) 22.

In one embodiment, one second sensor 30 is a temperature sensor 30-1 configured to detect the surface temperature $T_O$ of the vehicle occupant 17. A number of second temperature sensors 30-1 configured to detect individual temperatures of areas of the vehicle occupant 17, such as the head, the torso, and the leg areas is also envisioned. Furthermore, another second temperature sensor 30-2 is configured to detect a temperature of specifically identified radiant heating tile(s) 22, such as a tile(s) proximate an area of the occupant 17 having the detected surface temperature $T_O$. Alternatively, a separate embodiment of the second sensor 30-3 may utilize infrared technology. Such an infrared second sensor 30-3 may, therefore, be configured to generate a thermal image data indicative of each of the surface temperature $T_O$ of the vehicle occupant 17 and the temperature $T_t$ of the radiant heating tile(s) 22, and communicate such data via the second signal 32 and the third signal 33. Additionally, the signal generated by the infrared sensor 30-3 may combine both signals 32 and 33 into a single transmission. In a separate embodiment, the second sensor 30 may be a temperature sensor 30-4 specifically configured to detect a temperature $T_a$ of the ambient air in the cabin 16 proximate the vehicle occupant 17. Overall, the adaptive radiant heating system 20 may include a plurality of second sensors, such that more than one embodiment of the second sensor 30-1, 30-2, 30-3, and 30-4 with attendant specific parameters being detected, is included on the particular vehicle 10.

The adaptive radiant heating system 20 further includes an electronic controller 34. The electronic controller 34 is in operative communication with the plurality of radiant heating tiles 22, the first or position sensor(s) 26, and the second or temperature sensor(s) 30, and configured or programmed to regulate the thermal comfort of the vehicle occupant 17 via selective control of the plurality of tiles. The electronic controller 34 is configured to receive the first signal(s) 28, the second signal(s) 32, and the third signal(s) 33. The signals from the first and second sensors 26, 30 may be communicated to the electronic controller 34 via a data network, e.g. a Controller Area Network (CAN bus), arranged in the vehicle 10. The electronic controller 34 is configured, i.e., structured and programmed, to activate at least one of the plurality of radiant heating tiles 22 in response to the first, second, and third signals and 28, 32, 33 to thereby regulate the climate proximate the seat 18 and provide thermal comfort of the vehicle occupant 17.

As shown in FIG. 1, the electronic controller 34 is arranged on the vehicle 10. The electronic controller 34 may be a central processing unit (CPU) or a body control module (BCM) configured to regulate operation of various vehicle systems. The electronic controller 34 includes a memory that is tangible and non-transitory. The memory may be a recordable medium that participates in providing computer-readable data or process instructions. Such a medium may take many forms, including but not limited to non-volatile media and volatile media. Non-volatile media used by the electronic controller 34 may include, for example, optical or magnetic disks and other persistent memory.

Volatile media of each of the controller's memory may include, for example, dynamic random-access memory (DRAM), which may constitute a main memory. Such instructions may be transmitted by one or more transmission medium, including coaxial cables, copper wire and fiber optics, including the wires that comprise a system bus coupled to respective first and second sensors 26, 30. Memory of the electronic controller 34 may also include a flexible disk, hard disk, magnetic tape, other magnetic medium, a CD-ROM, DVD, other optical medium, etc. The electronic controller 34 may be equipped with a high-speed primary clock, requisite Analog-to-Digital (A/D) and/or Digital-to-Analog (D/A) circuitry, input/output circuitry and devices (I/O), as well as appropriate signal conditioning and/or buffer circuitry. Algorithms required by the electronic controller 34 or accessible thereby may be stored in the memory and automatically executed to provide the required functionality.

The electronic controller 34 may also be configured to select or identify one or more of the plurality of radiant heating tiles 22 corresponding to the detected position $P_O$ of the vehicle occupant 17 in the cabin 16, i.e., via the first sensor 26. The electronic controller 34 is additionally configured to compare the surface temperature $T_O$ of the vehicle occupant 17 and the temperature $T_t$ of the identified radiant heating tile(s) 22 to a predetermined climate or temperature set-point 36. Furthermore, the electronic controller 34 may be configured to automatically activate the identified one or more of the plurality of radiant heating tiles 22 based on the comparison of the detected surface temperature $T_O$ of the vehicle occupant 17 and the predetermined temperature set-point 36, as will be described below. FIG. 3 specifically depicts variable selection and activation of the radiant heating tiles 22 among the individual tile arrays 22A in accordance with various positions of the vehicle occupant 17. The varied positions of the vehicle occupant 17 are represented by an arrow 17A and the selected and activated tiles 22 are identified via shading. The predetermined temperature set-point 36 may be selected or over-ridden by an operator, such as the vehicle occupant 17, via an input to the electronic controller 34, as will be described in greater detail below. Accordingly, by varying intensity of heat output from the radiant heating tiles 22, the radiant heating system 20 may be configured to regulate and adapt localized climate in the cabin 16 to specific requirements of an individual vehicle occupant 17.

The electronic controller 34 is specifically configured to determine a rate of change of the surface temperature $dT_O/dt$ of the vehicle occupant 17. The electronic controller 34 is additionally configured to determine a difference $\Delta T$ between the temperature $T_t$ of the radiant heating tile(s) 22 and the surface temperature $T_O$ of the vehicle occupant 17 relative to the predetermined temperature set-point 36. The electronic controller 34 is additionally configured to regulate a power input from the energy storage device 24 to the radiant heating tile(s) 22 in response to determined temperature parameters. The energy storage device 24 power input to the radiant heating tile(s) 22 may be regulated via Pulse-width modulation (PWM) to generate a square wave current signal to reduce the average power delivered to the tile(s). Specifically, the electronic controller 34 may be programmed with and configured to execute an algorithm 37 using equivalent homogeneous temperature (EHT) derived from the determined $dT_O/dt$, $\Delta T$, $T_O$, and $T_a$ parameters to assess the PMV (Predicted Mean Vote) for the subject occupant 17 situated in the cabin 16 at a particular instance in time. As such, the algorithm 37 is used to determine the power input from the energy storage device 24 to the radiant heating tile(s) 22 in response to determined parameters.

PMV is an industry-wide standard for thermal comfort metric. The PMV scale extends from −3 through 0 to +3, wherein −3 signifies "cold", 0 signifies "neutral", and +3 signifies "hot". PMV is intended to take into account factors relevant to thermal comfort of an individual—from three modes of heat transfer between an individual and the surrounding environment (conduction, convection, and radiation) to personal factors, such as individual's metabolic rate, physical activity level, and clothing insulation. A standard PMV computation requires inputs such as air velocity, convective heat transfer coefficient, mean radiant temperature, relative humidity, etc. for its computation. However, presently, real-time measurements of such values inside a vehicle cabin are not practical. Accordingly, a modified PMV formula, the above noted algorithm 37, using EHT may avoid the requirement of direct measurements of air-velocity, heat transfer coefficient around the occupant(s), and the surrounding mean radiant temperature (MRT) to compute real-time PMV.

The algorithm 37 is configured to determine the power input to the radiant heating tile(s) 22 in response to the detected surface temperature $T_O$ of the vehicle occupant, the temperature $T_t$ of the radiant heating tile, the determined rate of change of the surface temperature $dT_O/dt$ of the vehicle occupant 17, and the detected temperature $T_a$ of ambient air in the cabin 16. The above regulation of the energy storage device 24 power input to the radiant heating tile 22 is thereby intended to regulate the surface temperature $T_O$ of the vehicle occupant 17. The algorithm 37 is based on the Predicted Mean Vote (PMV) model. The PMV model was developed using principles of heat balance and experimental data collected in a controlled climate chamber under steady state conditions. The PMV model may be applied to air-conditioned enclosures, such as buildings or vehicles.

The adaptive radiant heating system 20 may also include a gesture recognition feature, such as via a built-in camera, configured to acknowledge a vehicle occupant's physical gestures signifying operative system commands. The adaptive radiant heating system 20 may additionally include an over-ride feature 38A, such as a switch or an electronic operator input to the electronic controller 34 via a climate control panel 38 arranged in the cabin 16 (shown in FIGS. 2 and 3). The over-ride feature 38A is configured to over-ride the predetermined temperature set-point 36, i.e., deselect automatic activation of the radiant heating tiles 22 by the electronic controller 34. Furthermore, a desired temperature profile for each of the radiant heating tiles 22 may be preprogrammed and stored on an information technology (IT) cloud platform (not shown). Accordingly, in such an embodiment, the electronic controller 34 may be in operative communication with the IT cloud platform. Generally, an IT cloud platform is a provider-managed suite of hardware and software. An IT paradigm enables universal access to shared pools of configurable system resources and higher-level services that may be rapidly provisioned with minimal management effort, often over the Internet. Such utilization of IT cloud resources may be especially useful for managing a fleet of autonomous vehicles 10.

With resumed reference to FIG. 1, the motor vehicle 10 may additionally include a forced-air climate control system 40. The forced-air climate control system 40 may employ one or more heat exchangers 42 that utilize waste heat energy produced by the IC engine 12A as a byproduct of generated power. The subject heat exchanger(s) 42 may be configured as engine coolant-to-air type with the air being forced through the heat exchanger(s) via fan(s) (not shown). Accordingly, inside the heat exchanger(s) 42 coolant from the IC engine 12A is used to transfer heat energy to the exterior ambient air that is forced through the heat exchanger(s) and into the vehicle cabin 16 to provide cabin warm-up. However, initially during warm-up of the IC engine 12A, the engine's coolant does not absorb a significant amount of thermal energy. As a result, on a cold day, the cabin 16 may remain uncomfortably cool for an extended period of time. In the motor vehicle 10 employing each of the adaptive radiant heating system 20 and the forced-air climate control system 40, the electronic controller 34 may be additionally configured to supplement a heat output of the forced-air climate control system with the thermal energy generated by the plurality of radiant heating tiles 22.

Specifically, the electronic controller 34 may be programmed to coordinate regulation of the forced-air climate control system 40 and the selective control of the plurality of radiant heating tiles 22 to provide more rapid cabin 16 warm-up. For example, as the IC engine 12A is started from cold at sub-freezing temperature, the electronic controller 34 may access exterior ambient temperature data via an exterior temperature sensor 42 (shown in FIG. 1) and/or interior temperature data via the second sensor 30. The electronic controller 34 may then activate one or more of the plurality of the radiant heating tiles 22 to provide rapid warm-up of the cabin 16 proximate the seat(s) 18 occupied by the vehicle passenger(s). As the IC engine 12A warms up to provide sufficiently warm air into the cabin 16, the electronic controller 34 may reduce, pause, or halt the heat output of the subject radiant heating tiles 22 and supplement the output of the tiles with the forced-air climate control system 40. Accordingly, in such an embodiment, the electronic controller 34 may utilize and coordinate regulation of the forced-air climate control system 40 and the radiant heating system 20 to adapt the localized climate in the cabin 16 to the specific requirements of an individual vehicle occupant 17.

Figure 5:
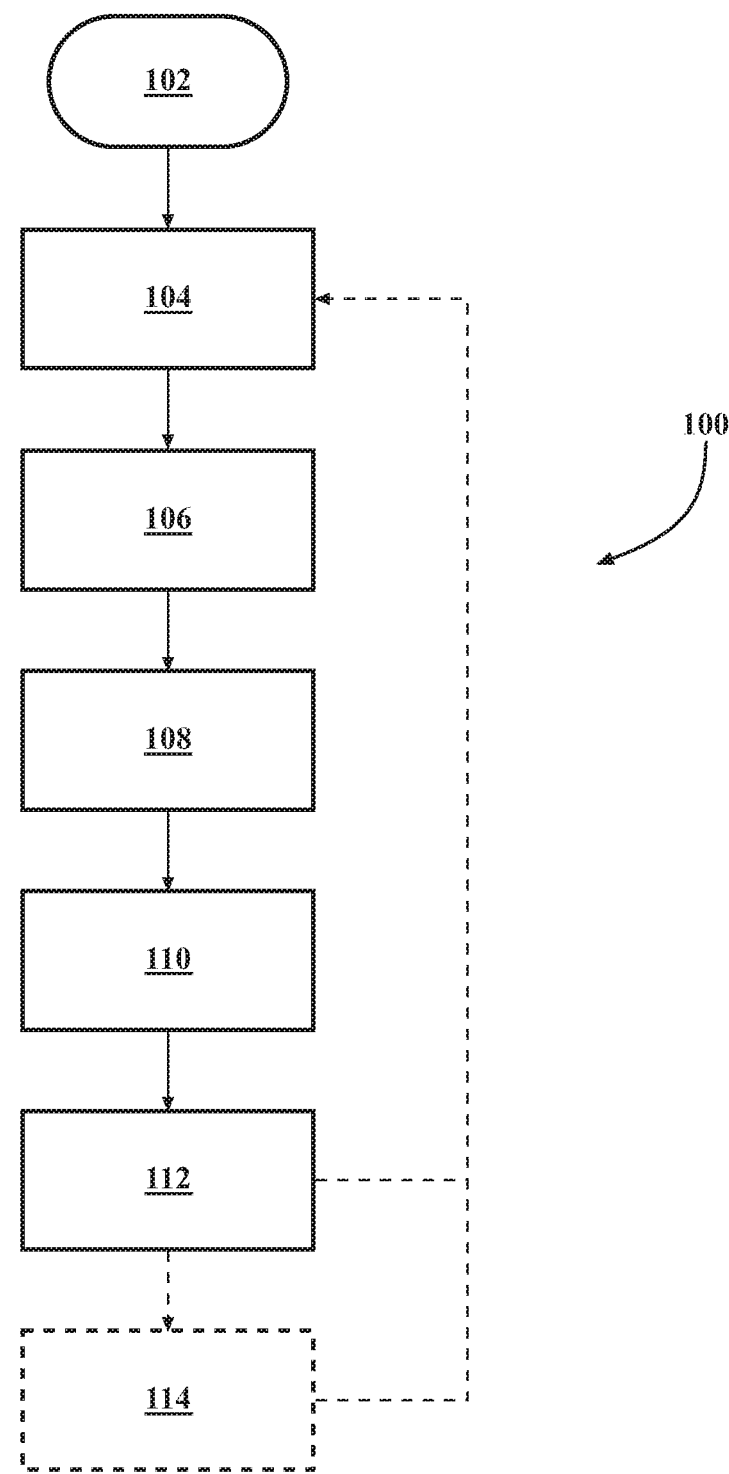
FIG. 5 is a flow diagram of a method for regulating thermal comfort of an occupant of a vehicle cabin shown in FIGS. 1-4, according to the present disclosure.

FIG. 5 depicts a method 100 of a method of regulating thermal comfort of a vehicle occupant 17 supported by the seat 18 in the cabin 16 of the motor vehicle 10, as described above with respect to FIGS. 1-4. The method 100 may initiate in frame 102 with providing one or more radiant heating tiles 22, for example, the array 22A, arranged inside the cabin 16 proximate the seat 18 supporting the occupant 17. Providing the radiant heating tile(s) 22 may include identifying, via the electronic controller 34, the radiant heating tile(s) corresponding to the detected position of the vehicle occupant 17 from among the plurality of radiant heating tiles, for example by selecting the appropriate tile(s) 22 from the array 22A. Additionally in frame 102 the method may also include activating, also via the electronic controller 34, the identified radiant heating tile(s) 22 to regulate the surface temperature $T_O$ of the vehicle occupant 17. Following frame 102 the method advances to frame 104.

In frame 104, the method includes detecting the position $P_O$ of the vehicle occupant 17 in the cabin 16 and generating the first signal 28 indicative of the detected position via the first or position sensor 26. The position sensor 26 may be an in-vehicle camera. After frame 104, the method proceeds to frame 106. In frame 106, the method includes detecting the surface temperature $T_O$ of the vehicle occupant 17 and generating the second signal 32 indicative of the detected surface temperature $T_O$. Still in frame 106, the method also includes detecting the temperature $T_t$ of the identified radiant heating tile(s) 22 and generating the third signal 33 indicative of the detected temperature $T_t$ of the subject tile(s).

According to the disclosure, the temperature $T_t$ is detected and the third signal 33 is generated by at least one of the second or temperature sensors 30. As discussed with respect to FIGS. 1-4, at least one of the second sensors 30 may be an infrared temperature sensor configured to generate a sensor image indicative of the surface temperature $T_O$ of the vehicle occupant 17 and the temperature $T_t$ of the radiant heating tile(s) 22. Additionally, in frame 106, the method may include detecting the temperature $T_a$ of ambient air in the cabin 17 via the at least one temperature sensor 30. Following frame 106, the method advances to frame 108.

In frame 108, the method includes receiving the first, second, and third signals 28, 32, 33 via the electronic controller 34. After frame 108, the method advances to frame 110. In frame 110, the method includes determining, via the electronic controller 34, the rate of change of the surface temperature $dT_O/dt$ of the vehicle occupant 17. Still in frame 110, the method includes determining the difference $\Delta T$ between the temperature $T_t$ of the radiant heating tile(s) 22 and the surface temperature $T_O$ of the vehicle occupant 17 relative to the predetermined temperature set-point 36. Following frame 110, the method proceeds to frame 112.

In frame 112 the method includes regulating, via the electronic 34, the power input from the energy storage device 24 to the identified radiant heating tile(s) 22, in response to the determined rate of change of the surface temperature $dT_O/dt$ of the vehicle occupant 17, the difference $\Delta T$ between the temperature $T_t$ of the radiant heating tile(s) 22, and the surface temperature $T_O$ of the vehicle occupant 17 to thereby regulate the surface temperature of the vehicle occupant 17. Additionally, in frame 112, the method may include executing, via the electronic controller 34, the algorithm 37 using EHT to assess the PMV for the subject occupant 17 situated in the cabin 16 in real-time. As described above with reference to FIGS. 1-4, the algorithm 37 is determinative of the power input from the energy storage device 24 to the radiant heating tile(s) 22 in response to the $dT_O/dt$, $\Delta T$, $T_O$, and $T_a$ parameters, as discussed above with respect to FIGS. 1-4. Following frame 112, the method may proceed to frame 114.

In frame 114, the method may include over-riding the predetermined temperature set-point 36 via an operator input to the electronic controller 34. As discussed above with respect to FIGS. 1-4, the vehicle occupant 17 may over-ride the predetermined temperature set-point 36 via the feature 38A, such as a switch or an electronic input at the climate control panel 38. Throughout frames 102-114, the method may include coordinating regulation of the radiant heating system 20 with the forced-air climate control system 40 via the electronic controller 34 to adapt the localized climate in the cabin 16 to the specific requirements of an individual vehicle occupant 17. Furthermore, after either frame 112 or frame 114, the method may return to frame 104 for detecting the position $P_O$ of the vehicle occupant 17 in the cabin 16 and generating the first signal 28 indicative of the detected position via the first or position sensor 26. Accordingly, the method 100 may include continuously regulating thermal comfort of the vehicle occupant 17 via the radiant heating tiles 22.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An adaptive radiant heating system for regulating thermal comfort of a vehicle occupant supported by a seat in a cabin of a motor vehicle, the adaptive radiant heating system comprising:
    a radiant heating tile arranged inside the cabin proximate the seat and configured to generate thermal energy;
    an energy storage device configured to power the radiant heating tile;
    a position sensor configured to detect a position of the vehicle occupant in the cabin and generate a first signal indicative of the detected position;
    at least one temperature sensor configured to detect a surface temperature of the vehicle occupant and generate a second signal indicative of the detected surface temperature, and configured to detect a temperature of the radiant heating tile and generate a third signal indicative of the detected temperature of the radiant heating tile; and
    an electronic controller in operative communication with the radiant heating tile, the position sensor, and the at least one temperature sensor, wherein the electronic controller is configured to:
        receive the first, second, and third signals;
        determine a rate of change of the surface temperature of the vehicle occupant and a difference between the temperature of the radiant heating tile and the surface temperature of the vehicle occupant relative to a predetermined temperature set-point; and
        regulate a power input from the energy storage device to the radiant heating tile in response to the determined rate of change of the surface temperature and the determined difference between the temperature of the radiant heating tile and the surface temperature of the vehicle occupant to thereby regulate the surface temperature of the vehicle occupant.

2. The system according to claim 1, wherein the radiant heating tile is one of a plurality of radiant heating tiles arranged inside the cabin proximate the seat, and wherein the electronic controller is additionally configured to:
    identify the radiant heating tile corresponding to the detected position of the vehicle occupant from among the plurality of radiant heating tiles; and
    activate the identified radiant heating tile to regulate the surface temperature of the vehicle occupant.

3. The system according to claim 2, wherein the motor vehicle includes a vehicle body defining the cabin, arranged along a longitudinal axis, and defined by longitudinal body sides, a floor, and a roof, and wherein the plurality of radiant heating tiles is arranged along the longitudinal axis in an array proximate one of the longitudinal body sides, the floor, or the roof.

4. The system according to claim 3, wherein the motor vehicle additionally includes a forced-air climate control system, and wherein the electronic controller is additionally configured to supplement a heat output of the forced-air climate control system with the thermal energy generated by the array of the plurality of radiant heating tiles, by coordinating regulation of the forced-air climate control system and the selective control of the plurality of radiant heating tiles.

5. The system according to claim 1, wherein the at least one temperature sensor is an infrared sensor configured to generate a sensor image indicative of the surface temperature of the vehicle occupant and the temperature of the radiant heating tile.

6. The system according to claim 1, wherein the at least one temperature sensor additionally includes a sensor configured to detect a temperature of ambient air in the cabin.

7. The system according to claim 6, wherein the electronic controller is further configured to execute an algorithm determinative of the power input from the energy storage device to the radiant heating tile in response to the detected surface temperature of the vehicle occupant, the temperature of the radiant heating tile, the determined rate of change of the surface temperature, and the detected temperature of ambient air in the cabin.

8. The system according to claim 1, wherein the position sensor is an in-vehicle camera configured to detect the position of the vehicle occupant.

9. The system according to claim 1, wherein the radiant heating tile is constructed from a positive temperature coefficient (PTC) material.

10. The system according to claim 1, further comprising an operator input to the electronic controller configured to over-ride the predetermined temperature set-point.

11. A method of regulating thermal comfort of a vehicle occupant supported by a seat in a cabin of a motor vehicle, the method comprising:
provoking a radiant heating tile arranged inside the cabin proximate the seat and powered via an energy storage device to generate thermal energy;
detecting a position of the vehicle occupant in the cabin and generating a first signal indicative of the detected position via a position sensor;
detecting a surface temperature of the vehicle occupant and generating a second signal indicative of the detected surface temperature and detecting a temperature of the radiant heating tile and generating a third signal indicative of the detected temperature of the radiant heating tile via at least one temperature sensor;
receiving the first, second, and third signals via an electronic controller in operative communication with the radiant heating tile, the position sensor, and the at least one temperature sensor;
determining, via the electronic controller, a rate of change of the surface temperature of the vehicle occupant and a difference between the temperature of the radiant heating tile and the surface temperature of the vehicle occupant relative to a predetermined temperature set-point; and
regulating, via the electronic controller, a power input from the energy storage device to the radiant heating tile in response to the determined rate of change of the surface temperature and the determined difference between the temperature of the radiant heating tile and the surface temperature of the vehicle occupant to thereby regulate the surface temperature of the vehicle occupant.

12. The method according to claim 11, wherein the radiant heating tile is one of a plurality of radiant heating tiles arranged inside the cabin proximate the seat, and wherein providing the radiant heating tile includes:
identifying, via the electronic controller, the radiant heating tile corresponding to the detected position of the vehicle occupant from among the plurality of radiant heating tiles; and
activating, via the electronic controller, the identified radiant heating tile to regulate the surface temperature of the vehicle occupant.

13. The method according to claim 12, wherein the motor vehicle includes a vehicle body defining the cabin, arranged along a longitudinal axis, and defined by longitudinal body sides, a floor, and a roof, and wherein the plurality of radiant heating tiles is arranged along the longitudinal axis in an array proximate one of the longitudinal body sides, the floor, or the roof.

14. The method according to claim 13, wherein the motor vehicle additionally includes a forced-air climate control system, the method additionally comprising supplementing a heat output of the forced-air climate control system with the thermal energy generated by the array of the radiant heating tiles, by coordinating regulation of the forced-air climate control system and the selective control of the radiant heating tiles via the electronic controller.

15. The method according to claim 11, wherein the at least one temperature sensor is an infrared sensor, the method additionally comprising generating, via the infrared sensor, a sensor image indicative of the surface temperature of the vehicle occupant and the temperature of the radiant heating tile.

16. The method according to claim 11, further comprising detecting a temperature of ambient air in the cabin via the at least one temperature sensor.

17. The method according to claim 16, further comprising executing, via the electronic controller, an algorithm determinative of the power input from the energy storage device to the radiant heating tile in response to the detected surface temperature of the vehicle occupant, the temperature of the radiant heating tile, the determined rate of change of the surface temperature, and the detected temperature of ambient air in the cabin.

18. The method according to claim 11, wherein the position sensor is an in-vehicle camera, the method further comprising detecting, via the in-vehicle camera, the position of the vehicle occupant.

19. The method according to claim 11, wherein the radiant heating tile is constructed from a positive temperature coefficient (PTC) material.

20. The method according to claim 11, further comprising over-riding the predetermined temperature set-point via an operator input to the electronic controller.

* * * * *